US009659390B2

United States Patent
Huo et al.

(10) Patent No.: US 9,659,390 B2
(45) Date of Patent: May 23, 2017

(54) TOMOSYNTHESIS RECONSTRUCTION WITH RIB SUPPRESSION

(71) Applicant: Carestream Health, Inc., Rochester, NY (US)

(72) Inventors: Zhimin Huo, Pittsford, NY (US); Richard A. Simon, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 113 days.

(21) Appl. No.: 14/621,955

(22) Filed: Feb. 13, 2015

(65) Prior Publication Data
US 2015/0154765 A1 Jun. 4, 2015

Related U.S. Application Data

(63) Continuation-in-part of application No. 14/084,651, filed on Nov. 20, 2013, now Pat. No. 9,269,139.
(Continued)

(51) Int. Cl.
*G06T 7/00* (2006.01)
*G06T 11/00* (2006.01)
(Continued)

(52) U.S. Cl.
CPC .............. *G06T 11/005* (2013.01); *G06T 7/12* (2017.01); *G06T 7/143* (2017.01); *G06T 7/174* (2017.01);
(Continued)

(58) Field of Classification Search
CPC . G06T 2208/30064; G06T 2207/30061; G06T 2207/10081; G06T 7/0081; G06T 7/0083
See application file for complete search history.

(56) References Cited

U.S. PATENT DOCUMENTS 7,085,407 B2   8/2006  Ozaki
8,094,904 B2   1/2012  Slabaugh et al.
(Continued)

OTHER PUBLICATIONS

Suzuki et al., Image-Processing Technique for Suppressing Ribs in Chest Radiographs by Means of Massive Training Artificial Neural Network (MTANN), *IEEE Transactions on Medical Imaging*, vol. 25, No. 4, pp. 406-416, (Apr. 2006).
(Continued)

*Primary Examiner* — Utpal Shah

(57) ABSTRACT

A method for rib suppression in a volume chest x-ray image, executed at least in part by a computer captures a first set of unsegmented projection images, each at a corresponding angle, and forms a second set of segmented projection images by detecting rib features in a first projection image to form a first segmented projection image and generating a base model according to the detected rib features for the first projection image. Each of one or more additional projection images from the first set is processed to add members to the second set by a repeated sequence of generating a predictive model; detecting rib features using the predictive model; adjusting the base model according to detected rib features; and correcting rib detection in one or more members of the second set. The volume chest x-ray image is reconstructed according to the segmented projection images and is displayed.

19 Claims, 20 Drawing Sheets

Related U.S. Application Data which is a continuation-in-part of application No. 13/527,629, filed on Jun. 20, 2012, now Pat. No. 8,913,817.

(60) Provisional application No. 61/728,829, filed on Nov. 21, 2012, provisional application No. 61/552,658, filed on Oct. 28, 2011.

(51) Int. Cl.
*G06T 7/12* (2017.01)
*G06T 7/143* (2017.01)
*G06T 7/174* (2017.01)

(52) U.S. Cl.
CPC ............ *G06T 2207/10081* (2013.01); *G06T 2207/10116* (2013.01); *G06T 2207/10124* (2013.01); *G06T 2207/20128* (2013.01); *G06T 2207/30008* (2013.01); *G06T 2207/30061* (2013.01); *G06T 2207/30172* (2013.01); *G06T 2210/41* (2013.01)

(56) References Cited

U.S. PATENT DOCUMENTS

| | | | |
|---|---|---|---|
| 8,204,292 B2 | 6/2012 | Knapp et al. | |
| 9,375,184 B2* | 6/2016 | Boettger | A61B 5/7275 |
| 2006/0147114 A1* | 7/2006 | Kaus | G06T 7/0083 |
| | | | 382/173 |
| 2007/0019852 A1 | 1/2007 | Schildkraut et al. | |
| 2007/0086639 A1 | 4/2007 | Sakaida | |
| 2007/0086640 A1 | 4/2007 | Luo et al. | |
| 2009/0060366 A1* | 3/2009 | Worrell | G06K 9/346 |
| | | | 382/256 |
| 2009/0060372 A1 | 3/2009 | Maton et al. | |
| 2009/0190818 A1 | 7/2009 | Huo | |
| 2009/0214099 A1 | 8/2009 | Merlet | |
| 2010/0295848 A1* | 11/2010 | Grewer | G06T 7/0081 |
| | | | 345/419 |
| 2011/0052018 A1* | 3/2011 | Blaffert | G06T 7/0081 |
| | | | 382/128 |
| 2011/0058061 A1* | 3/2011 | Franz | G06T 7/0083 |
| | | | 348/222.1 |
| 2011/0169864 A1* | 7/2011 | Lorenz | G06F 19/3487 |
| | | | 345/641 |
| 2011/0175909 A1* | 7/2011 | Lorenz | G06T 15/08 |
| | | | 345/419 |
| 2013/0289332 A1* | 10/2013 | Purdie | A61N 5/1039 |
| | | | 600/1 |
| 2015/0279034 A1* | 10/2015 | Knapp | G06T 11/008 |
| | | | 382/131 |

OTHER PUBLICATIONS

Vogelsang et al., Detection and Compensation of Rib Structures in Chest Radiographs for Diagnose Assistance *Proceedings of SPIE*, 3338, pp. 774-785 (1998).

Vogelsang et al., Model based analysis of chest radiographs, *Proceedings of SPIE 3979*, pp. 1040-1052, (2000).

M. Loog, B. van Ginneken et al., "Filter learning: Application to suppression of bony structures from chest radiographs", Medical Image Analysis, 10 (2006), pp. 826-840.

Yonghong Shi et al., Segmenting Lung Fields in Serial Chest Radiographs Using Both Population-Based and Patient-Specific Shape Statistics, IEEE Transactions on Medical Imaging, vol. 27, No. 4, Apr. 2008, pp. 481-494.

\* cited by examiner

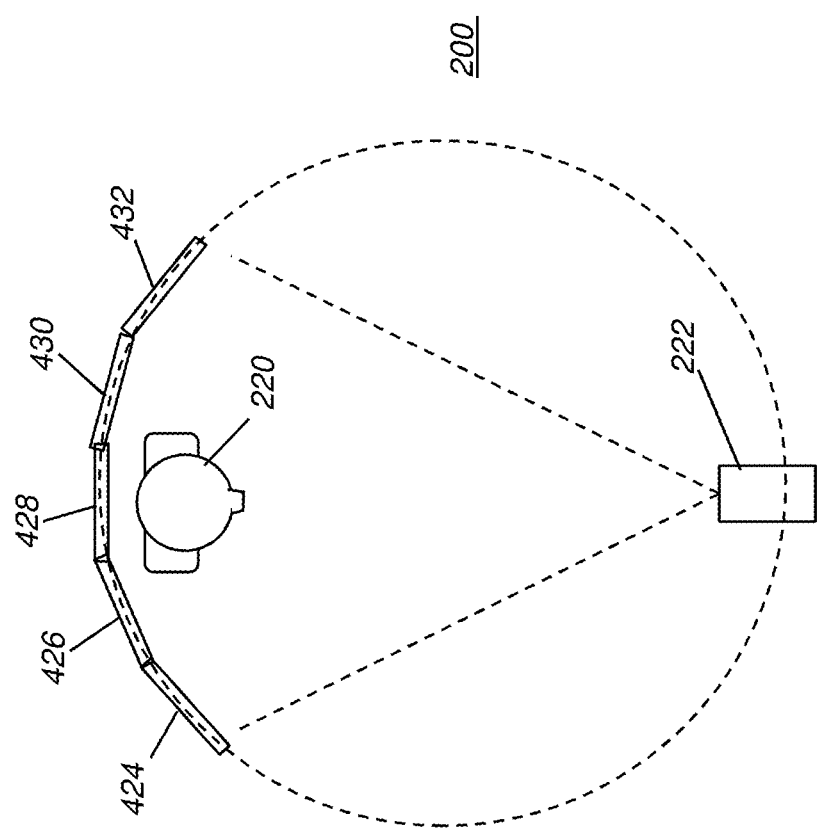

TOMOSYNTHESIS RECONSTRUCTION WITH RIB SUPPRESSION

CROSS REFERENCE TO RELATED APPLICATIONS

This application is a Continuation-in-Part of U.S. Ser. No. 14/084,651 entitled "RIB SUPPRESSION IN RADIOGRAPHIC IMAGES" by Huo et al., filed on Nov. 20, 2013 and published as US 2014/0079309; which was itself a Continuation-in-Part of U.S. Ser. No. 13/527,629 entitled, "RIB SUPPRESSION IN RADIOGRAPHIC IMAGES" by Huo et al., filed Jun. 20, 2012 and granted as U.S. Pat. No. 8,913,817; both of which are incorporated herein by reference.

FIELD OF THE INVENTION

The invention relates generally to the field of volume imaging and more particularly to methods for forming a volume image with suppressed rib cage features.

BACKGROUND OF THE INVENTION

The chest x-ray is widely used for detecting a number of patient conditions and for imaging a range of skeletal and organ structures. Radiographic images of the chest are useful for detection of lung nodules and other features that indicate lung cancer and other pathologic structures and other life-threatening conditions.

The chest region includes a wide range of tissues, ranging from rib and other bone structures to the lung parenchyma. This greatly complicates the task of radiographic imaging for the chest region, since the different types of bone and tissue materials have widely different densities. Optimization techniques for chest imaging require making a number of compromises to provide a suitable signal-to-noise (S/N) ratio and sufficient contrast for soft tissue.

Given this complexity of image content, the challenging task of forming a volume image of the chest using tomography is even more formidable. Due to factors such as beam hardening, rib edges, and various other features of the image content that is obtained and used to form the volume image, various types of artifacts are often generated, obscuring image content of interest and rendering the chest volume image less useful to the practitioner. One type of artifact that is characteristic of the tomography chest volume image is a ripple artifact that is caused by rib edges. When the projection image data is processed to form the tomography volume image, ripple artifacts are often visible in the rendered volume image and can be difficult to correct or minimize.

Due to the limited sweep angle used in tomosynthesis imaging, the data acquired is not sufficient to accurately reconstruct the scanned object. As a result of some amount of missing data, the tomosynthesis reconstruction can produce numerous artifacts in subsequent reconstruction of volume image content. In particular, high contrast objects produce ripple artifacts in the in-plane slice images (streak artifacts in the depth images) of tomosynthesis. These artifacts are due to the incomplete cancellation of objects that are spatially located outside the reconstructed image plane. The ripple artifact can be suppressed by increasing the projection density, the number of projection images acquired divided by the scan angle. Or, alternatively, the ripple artifact can be suppressed by low pass filtering the reconstruction; however, this can result in a blurred reconstruction, limiting its diagnostic utility. Thus, there remains a need for a method for reducing ripple artifacts to increase the diagnostic quality of the reconstructed images, with a lower number of projection images translating into lower dose exams and shorter scan times than are used for other volume imaging modalities.

In 2-D radiological imaging, various methods have been proposed and used for detecting and suppressing rib structures and allowing the radiologist to view the lung fields without perceptible obstruction by the ribs. Some methods have used template matching or rib edge detection and curve fitting edge detection.

Among other solutions that have been proposed for rib suppression, US 2009/0290779 entitled "Feature-based neural network regression for feature suppression" by Knapp describes the use of a trained system for predicting rib components and subsequently subtracting the predicted rib components. US 2009/0060366 entitled "Object segmentation in images" by Worrell describes techniques using detected rib edge to identify rib structures.

An article entitled "Image-Processing Technique for Suppressing Ribs in Chest Radiographs by Means of Massive Training Artificial Neural Network (MTANN)" by Suzuki et al. in *IEEE Transactions on Medical Imaging, Vol. 25 No. 4*, April 2006 describes methods for detection of lung nodules and other features using learned results from a database to optimize rib suppression for individual patient images. The MTANN approach described above has limitations, however, as it requires dual energy images as part of the training database. Further, MTANN may not be able to accurately estimate the edge of the bone as well as it estimates the bone density elsewhere. As a result, further work on the bone edge suppression is required.

An article entitled "Detection and Compensation of Rib Structures in Chest Radiographs for Diagnose Assistance" in Proceedings of SPIE, 3338:774-785 (1998) by Vogelsang et al. describes methods for compensating for rib structures in a radiographic image. Among techniques described in the Vogelsang et al. article are template matching and generation and selection from candidate parabolas for tracing rib edges.

An article entitled "Model based analysis of chest radiographs", in Proceedings of SPIE 3979, 1040 (2000), also by Vogelsang et al. describes Bezier curve matching to find rib edges in a chest radiograph for alignment of a model and subsequent rib shadow compensation. Interpolation and a compensation mask are employed in this method.

While some of these 2-D methods may have achieved a level of success for suppression of rib structure using rib edge detection approaches to identify rib structures, improvements can be made. For example, effort is needed to adapt the rib detection method to individual patient images, as template or function-fitting of the detected rib edge methods have limitations for handling large variations in the shape of ribs and image quality. This can be more difficult when foreign objects, e.g., tubes/lines and other devices, are captured in ICU portable chest images.

With many of these methods, non-zero density estimation in non-rib areas could contribute to added noise in these areas, which will affect the overall image quality of the rib suppressed images. The rib detection methods used have generally been memory-intensive, requiring significant computational resources. Robustness is also desirable. Even if rib structures are well-defined, however, it can be challenging to remove rib features from the chest x-ray image without degrading the underlying image content that can include lung tissue. There is a need for a method of rib suppression which accurately detects the ribs including clavicles in chest x-ray images and suppresses the rib area only, while preserving the image content of underlying lung tissue. This is of particular utility for generating tomography volume images from a set of 2-D projection images. Each 2-D projection image can be individually processed to suppress and remove rib content. However, a number of the methods described previously provide disappointing results for tomographic imaging when such processed images are combined.

Thus, it can be seen that there is a need for improved methods for generating tomography volume images having suppressed rib content.

SUMMARY OF THE INVENTION

Embodiments of the present invention address the need for improved methods for generating tomographic images of the chest cavity. Advantageously, embodiments of the present invention preserve image content for lungs and other organs within the chest cavity, while suppressing rib content. Volume images generated using the methods of the present invention can provide improved image quality and exhibit reduced ripple artifacts.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for rib suppression in a volume chest x-ray image, the method executed at least in part by a computer system and comprising: forming a first set of unsegmented projection images by capturing a plurality of projection images, each projection image having a corresponding capture angle; forming a second set of segmented projection images from the first set of unsegmented projection images by: (i) detecting rib features in a first unsegmented projection image to form a first segmented projection image in the second set and generating a base model according to the detected rib features for the first unsegmented projection image; (ii) processing each of one or more additional unsegmented projection images from the first set to add members to the second set by a repeated sequence of: (1) generating a predictive model from the base model; (2) detecting rib features in the unsegmented projection image using the generated predictive model to store a segmented image in the second set of images; (3) adjusting the base model according to the detected rib features; and (4) optionally correcting rib detection in one or more members of the second set of images; conditioning one or more of the unsegmented projection images of the first set of images to suppress rib content based on information from segmentation of the second set of images. reconstructing the volume chest x-ray image according to two or more of the conditioned projection images; and displaying the reconstructed volume chest x-ray image.

According to another alternate aspect of the present invention, there is provided a method for rib suppression in a volume chest x-ray image, the method executed at least in part by a computer system and comprising: forming a first set of unsegmented projection images by capturing a plurality of projection images, each at a corresponding capture angle; forming a second set of segmented projection images from the first set of unsegmented projection images by: (i) detecting ribs in a subset of the unsegmented projection images; (ii) segmenting rib content within the subset of images; (iii) registering the subset of images to each other; (iv) generating a base model according to the registered subset of images; (v) processing each of one or more additional unsegmented projection images from the first set to add members to the second set by a repeated sequence of: (1) generating a predictive model from the base model; (2) detecting rib features in the unsegmented projection image using the generated predictive model to store a segmented image in the second set; (3) adjusting the base model according to the detected rib features; and (4) optionally correcting rib detection in one or more members of the second set; conditioning one or more of the unsegmented projection images of the first set of images to suppress rib content based on information from segmentation of the second set of images; reconstructing the volume chest x-ray image according to two or more of the conditioned projection images; and displaying the reconstructed volume chest x-ray image.

According to an alternate aspect of the present invention, there is provided a method for rib suppression in a volume chest x-ray image, the method executed at least in part by a computer system and comprising: forming a first set of unsegmented projection images by capturing a plurality of projection images, each at a corresponding capture angle; forming a second set of segmented projection images from the first set of unsegmented projection images by a repeated sequence of: (i) designating a first projection image from among members of the first set of images that are not yet segmented; (ii) detecting rib features in the first projection image and in at least one adjacent projection image that was captured before or following the first projection image; (iii) refining the rib feature detection for the first projection image according to the rib feature detection for the at least one adjacent projection image to generate a first segmented projection image; (iv) assigning the first segmented projection image to the second set of images; suppressing rib feature content from one or more of the unsegmented projection images of the first set of images based on the segmented information from the second set of images; reconstructing the volume chest x-ray image according to the plurality of rib-suppressed projection images; and displaying the reconstructed volume chest x-ray image.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 14 is a schematic diagram showing a set of acquired projection images.

FIG. 15B 15A is a logic flow diagram that shows an alternate approach for generating a base model.

DETAILED DESCRIPTION OF THE INVENTION

Figure 1:
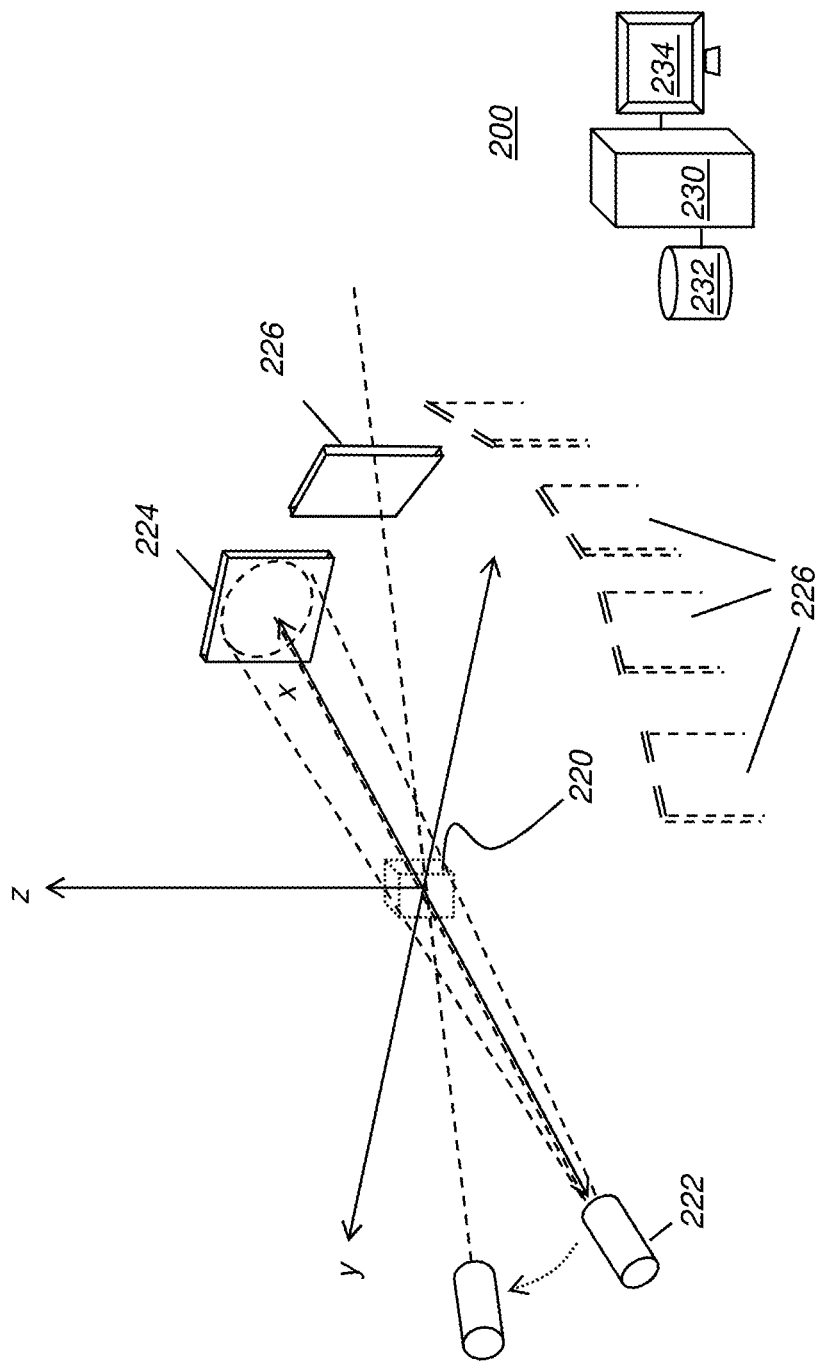
FIG. 1 is a schematic diagram that shows components of a tomographic imaging apparatus for obtaining and processing projection images to provide volume image data.

The following is a detailed description of the preferred embodiments of the invention, reference being made to the drawings in which the same reference numerals identify the same elements of structure in each of the several figures.

Where they are used, the terms "first", "second", "third", and so on, do not necessarily denote any ordinal or priority relation, but may be used for more clearly distinguishing one element or time interval from another.

In the context of the present disclosure, the term "image" refers to multi-dimensional image data that is composed of discrete image elements. For 2D (two-dimensional) images, the discrete image elements are picture elements, or pixels. For 3D (three-dimensional) images, the discrete image elements are volume image elements, or voxels.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present invention, an "ordered set" refers to a set that has an assigned ordering or indexing of its successive elements. Specifically, an ordered set of projection images is obtained by arranging projection images in order as they are acquired in time. Each member of the set is a projection image that has an associated angular increment that relates to the relative angle of the radiation source to its detector, with the patient in a fixed position. Each member of the set has at least one adjacent member, which refers to the image taken immediately before or immediately preceding it. The first image in the ordered set has no predecessor or preceding image in the set; the last image in the ordered set has no following or subsequent image in the set. Any image in the ordered or indexed set of projection images other than the first or last image has both a preceding image and a subsequent image in that set. It should be noted that an ordered set of images does not need to be stored in any particular order in memory. The ordering or indexing of the set relates to an association by which each image in the set has associated data that indicates the order in which each image has been acquired, which may include the angle of the source or detector relative to the imaged subject, whether the angle is stored as an absolute angular value or an incremental angular value relative to the previous or succeeding image, for example, or may simply indicate the order in which the image was obtained relative to a series of n images. Methods for indexing images so that it can be readily ascertained which images are adjacent in time or by angle are familiar to those skilled in the image processing arts. In the context of the present disclosure, image ordering is expressed in standard notation, so that an image n may be considered to have a position in a sequence of obtained images, such that, for image n, the image that is at the next angular increment is referred to or indexed as image (n+1); similarly, the image that is at the preceding angular increment is referred to as image (n−1). Indexing also uses the letter m or some other index in the same manner, following conventional practices for image indexing. These images are typically taken in order in the tomosynthesis imaging sequence; however, it is possible to acquire and store images in any order, provided that sufficient information for indexing images according to relative or absolute angle is associated with each 2-D projection image. It is understood that image ordering is relevant for 3-D image reconstruction, in which a series of two or more 2-D projection images is processed to generate a 3-D volume image.

In the context of the present disclosure, the terms "viewer", "operator", and "user" are considered to be equivalent and refer to the viewing practitioner or other person who views and manipulates an image, such as a dental image, on a display monitor. An "operator instruction" or "viewer instruction" is obtained from explicit commands entered by the viewer, such as using a computer mouse or touch screen or keyboard entry.

The subject matter of the present invention relates to digital image processing and computer vision technologies, which is understood to mean technologies that digitally process data from a digital image to recognize and thereby assign useful meaning to human-understandable objects, attributes or conditions, and then to utilize the results obtained in further processing of the digital image.

Digital X-ray tomosynthesis is an imaging technique that enables three-dimensional imaging of a patient using a large-area digital detector of the type that is typically used for conventional (single projection) radiography. A finite number of projection images are acquired over a limited angular range, typically between about 20° and 40°, by varying the relative orientations of the x-ray tube, patient and detector. This is usually accomplished by either moving both the detector and x-ray source or by fixing the position of the detector (source) and moving the x-ray source (detector) relative to the source. In applications were the detector is fixed in position, multiple spatially distributed X-ray sources may be used or movable sources may be displaced in various patterns or trajectories. Three-dimensional data is reconstructed from the captured projections in the form of a number of slices (in-plane) through the patient anatomy, each parallel to the detector plane. One consequence of limited angular scanning is that the in-depth resolution is appreciably lower than the in-plane resolution of the reconstructed object.

FIG. 1 shows a tomographic imaging apparatus 200 that has a radiation source 222 and a detector 224 that records a digital image of a patient or other subject 220 at each of a number of angles. Each 2-D image is termed a projection image 226. A processor 230 stores and processes each recorded 2-D projection image in a memory 232, along with information relating to relative angle of the projection image, and generates volume image data for viewing on a display 234, with suppressed rib content, allowing improved imaging of other tissues within the chest cavity.

There appear to be a number of possible approaches to the problem of rib suppression in generating the volume image data. Although it is straightforward to detect ribs in the volume image, attempts to suppress or remove the rib content in the volume image itself, once generated, are often unsatisfactory. Filtering during the process of obtaining projection images can be successful, but does not appear to be sufficiently robust and can be highly dependent on factors such as patient size, for example and can require modification based on the number of images obtained and the overall angular range that is used. Some useful information can be lost in the filtering process.

The Applicants have adopted a third approach to this problem: suppression and removal of rib content in each of the successive 2-D projection images. The modified projection images can then be combined using conventional reconstruction techniques in order to generate the volume image data. In order to make this method work successfully, however, consistent and accurate results must be obtained in processing each individual projection image. Unlike other types of volume image, chest images include a broad range of bone and soft tissue types, so that conventional attempts at bone identification and suppression do not appear to provide satisfactory results for generating 2-D projection images that can be used for reconstruction with removed rib content.

Conventional rib detection techniques typically first locate rib/line edges, then use rib edge information to identify rib structures that lie between the rib edges in the 2-D image. The inventors have found results from this conventional approach to be disappointing, often failing to provide sufficiently accurate information on rib structures for acceptable levels of rib suppression. Embodiments of the present invention address the problem of rib suppression for the 2-D projection image content in a different manner, by detecting rib regions first. Then, once features of individual rib structures have been identified, the method more accurately and robustly locates rib edges. This approach allows the complete rib structure to be identified and its affect on image content more accurately profiled than has been achieved using conventional methods.

Figure 2:
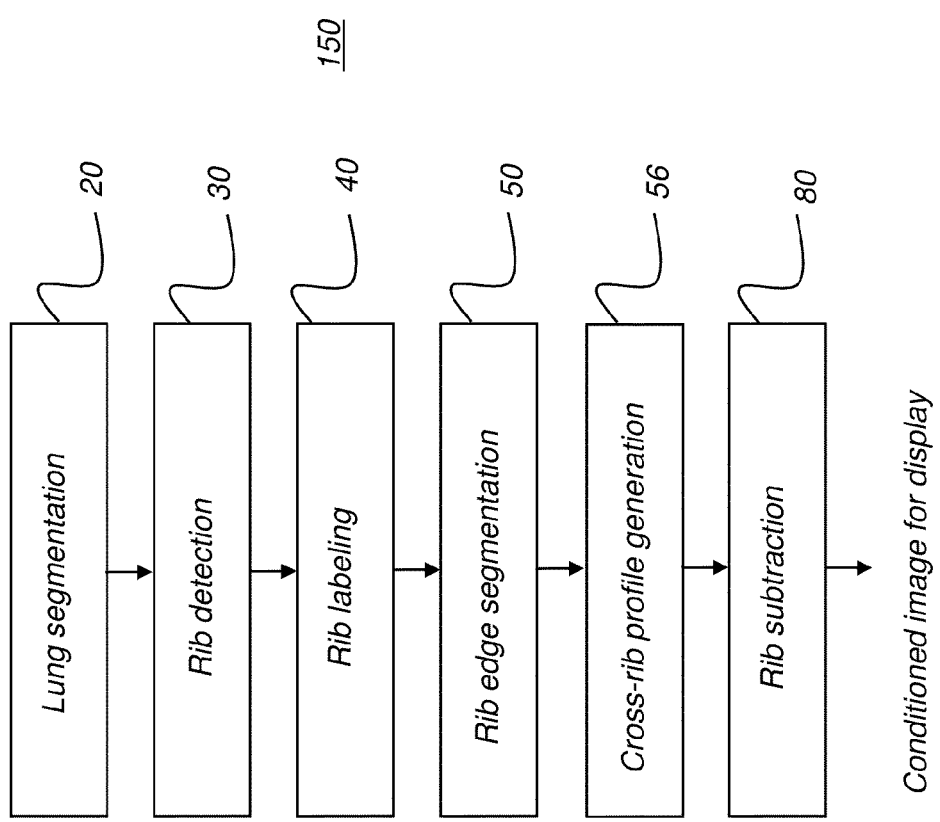
FIG. 2 is a logic flow diagram that shows steps of a procedure for rib suppression according to an embodiment of the present invention.

The logic flow diagram of FIG. 2 shows, as a rib suppression process 150, a sequence for automated rib suppression in 2-D projection images that is consistent with an embodiment of the present invention for chest x-ray image processing. The chest x-ray image can originate from a digital radiography (DR) detector or from an image archive. In a lung segmentation process 20, the lung and rib cage portions of the image are segmented, thus extracting the lung region of interest from the image. A number of approaches to lung segmentation have been proposed, including, for example, that described in U.S. Pat. No. 7,085,407 entitled "Detection of Ribcage Boundary from Digital Chest Image" to Ozaki that employs landmark detection and other utilities to detect the boundaries of the rib cage. Other methods for lung detection and segmentation include methods that detect the spine structure and use a bounding box for coarse detection, with subsequent processing for more closely identifying the boundaries of the lung or rib cage. Neural network-based logic can also be employed for generating a pixel-based lung segmentation. Boundary smoothing can also be employed, such as by using morphological filtering or other suitable processing technique, for example.

Continuing with FIG. 2 processing, with the lung region of interest or area including lung identified, a rib detection process 30 follows, in which structural information about the rib features is used in conjunction with image pixel intensities to separate likely rib content from non-rib image content. This step helps to eliminate from processing the image content that is not obstructed by rib features and has been found to provide improved results. Further processing of the candidate rib content is executed in a rib labeling step 40 that groups and organizes the detected rib contents. In rib labeling step 40, classification of the rib content groups likely rib pixels into corresponding categories for labeling as part of individual ribs, labels these pixels as part of the rib content of the image, and helps to remove false positives from rib detection process 30. Position, shape information and gradient are used, for example, to help eliminate false positives. Processing in step 40 provides for classifying pixels into one or more of multiple ribs, using some amount of prior knowledge of rib structures, such as shape, position, and general direction, and applying morphological filtering. Among features that have been found to be particularly useful for rib classification are rib width and position, including percentage of pixels initially determined to be part of a rib feature. Other features could similarly be extracted and used for false-positive removal. Rib labeling in labeling step 40 alternately calculates a medial axis for one or more ribs to generate a skeletal image for validating rib detection and for subsequent processing including rib modeling for retrieving missing or missed-labeled ribs or portion of ribs. The skeletal image has medial axis information and, optionally, other anatomical data relevant to rib location.

Characteristics such as gradient orientation and shape for the labeled rib content can then be used for subsequent processing in a rib edge segmentation step 50. In rib edge segmentation step 50, edge portions of the ribs are identified, and this identification is refined using iterative processing. Guided growth processing may alternately be used to enhance rib edge detection. A cross-rib profiling step 56 generates a cross-rib profile that provides values for rib compensation along the detected ribs. Finally, a rib subtraction step 80 is executed, subtracting rib edges and values from the rib profile from the chest x-ray image, to condition the image and provide a rib-suppressed x-ray image for display. Other types of conditioning can be used for combining the detected rib information with the original x-ray image to generate a rib-suppressed image for display or for further analysis.

Figure 3:
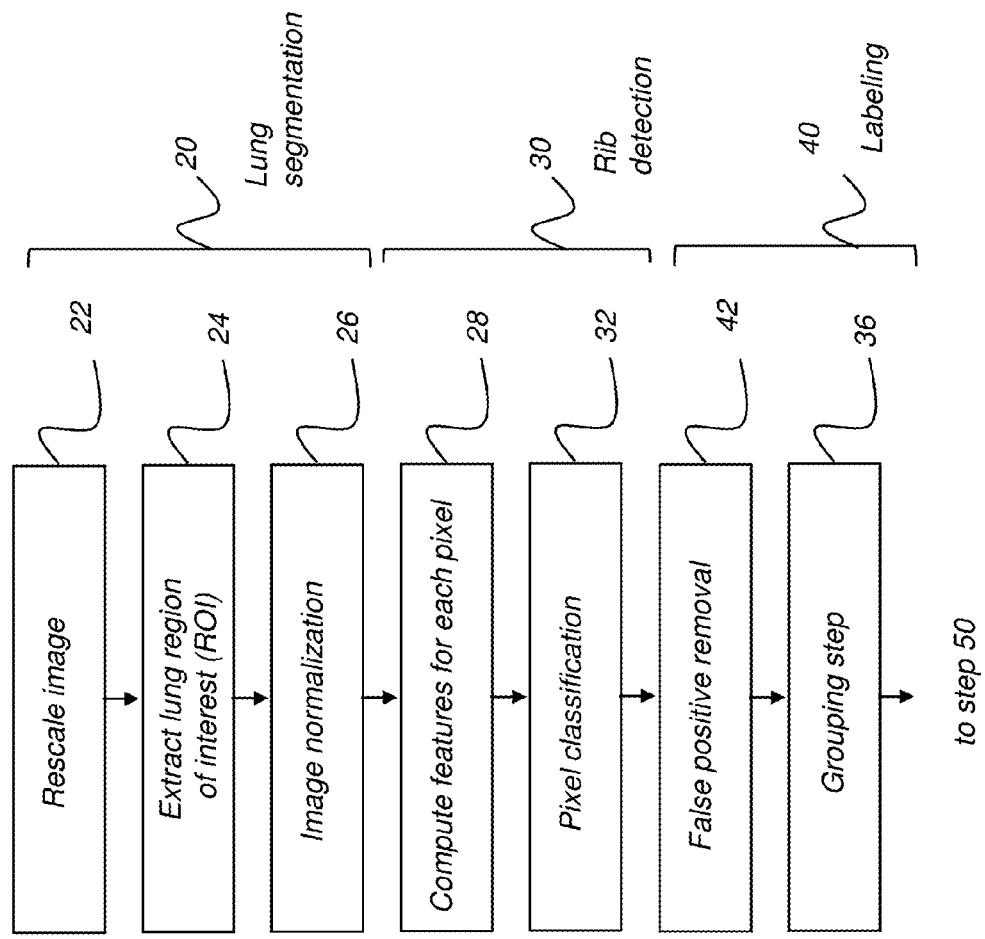
FIG. 3 is a logic flow diagram that shows processing that is performed in lung segmentation and rib detection.

The logic flow diagram of FIG. 3 shows processing that is performed in lung segmentation process 20, rib detection process 30, and labeling step 40, and how the results of this processing are used. In an optional scaling step 22, the image can be scaled to a lower resolution in order to speed subsequent processing. An extract ROI step 24 helps to generate position features information for more accurate definition of the region of interest (ROI). An image normalization step 26 then provides normalized information on image features, consistent with multiple images.

Rib detection process 30 determines, for pixels in the region of interest, whether or not each pixel corresponds to a rib feature. Rib detection process 30 has a features computation step 28 that computes features for each pixel, such as providing Gaussian derivative features information and position information, for example. Next, as part of rib detection step 30, a pixel classification step 32 determines whether each pixel within the lung region is a rib or non-rib pixel. Classifier techniques such as artificial neural network, supporting vector machine or random forests that are well known in the art can be used to perform the pixel classification.

In this sequence, labeling process 40 is also shown in more detail. A false positive removal step 42 executes for identifying individual ribs. False-positive pixels are first removed as part of this processing. A subsequent grouping step 36 then determines whether or not one or more groups of detected pixels can themselves be grouped together as one individual rib, based on factors such as positional relationship, connectedness and adjacence, gradient features, and the position relative to the central axis of individual groups. These ribs can be labeled according to rib pattern. Global rib modeling, based on ribs that have already been labeled and known anatomical relationships, can be used to detect a missing rib from the previous steps.

Figure 4:
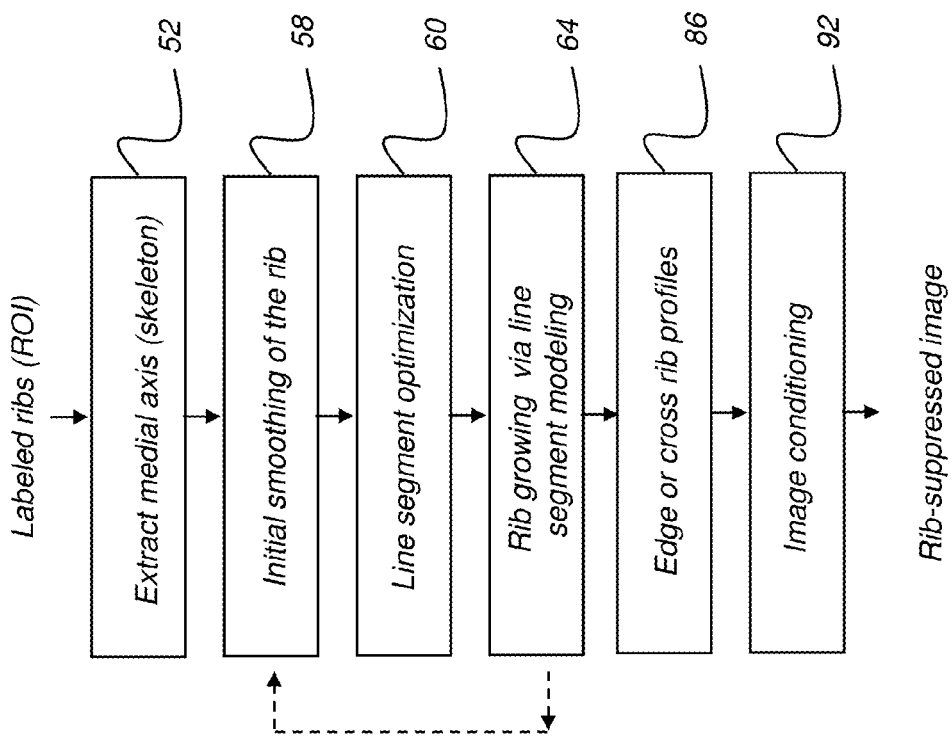
FIG. 4 is a logic flow diagram that shows iterative processing that is performed for each detected or labeled rib as part of rib edge segmentation.

The logic flow diagram of FIG. 4 shows iterative processing that is performed for each detected or labeled rib, after the processing described with respect to FIG. 3, as part of rib edge segmentation 50 (FIG. 2). The input to this processing is the set of labeled ribs. A medial axis extraction step 52 obtains the medial axis of each rib. An initial smoothing step 58 performs any necessary fitting to smooth rib edges, according to the extracted medial axis. As part of smoothing step 58, the smoothed boundaries provide a starting point for more closely approximating rib edges. Using the smoothed rib contour, one or more line segments for the upper or lower rib boundaries are generated as initial rib edge candidates. Next, in a line segment optimization step 60, one or more additional line segment candidates for each segment are generated based on calculated gradients or other features. A set of the best-fit edge candidates for the upper and lower rib edge is selected, using optimization of a model based on factors such as edge gradients, rib width, line segment smoothness, and rib shape constraints.

Continuing with the sequence of FIG. 4, a rib growing step 64 continues line segment optimization step 60 to extend existing line segments and to merge disconnected line segments as they are detected or extrapolated from existing segments. A growing algorithm is useful where segments of the ribs are foreshortened or missing. As part of a growing algorithm, existing segments are aligned according to an anatomy model. Segments are iteratively extended and tested to determine whether or not growth is completed. Segment growth can also use edge extension techniques such as those employed for tubing detection and described in commonly assigned, copending U.S. Patent Application No. 2009/0190818 entitled "Computer-Aided Tubing Detection" by Huo. A cross-rib profile generation step 86 generates cross-rib profile data, as described in more detail subsequently.

Repeated iteration of the sequence of steps 58, 60, and 64, as many times as needed, helps to improve the rib profiles provided, so that rib data that is combined with the image data in an image conditioning step 92 more accurately characterizes the rib content.

Figure 5B:
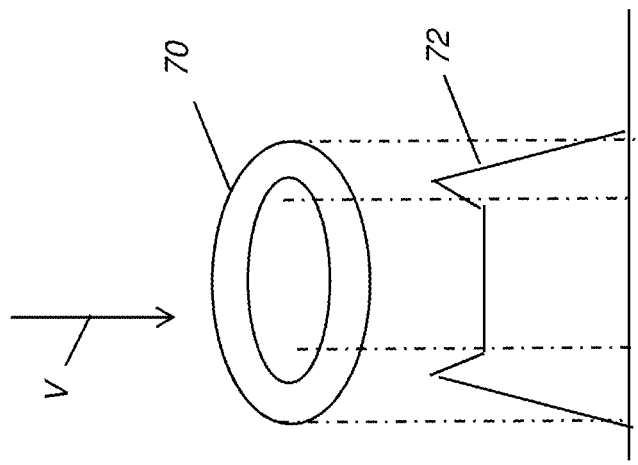
FIG. 5B is a schematic diagram that shows how a cross-rib profile for a chest x-ray is generated.
Figure 5A:
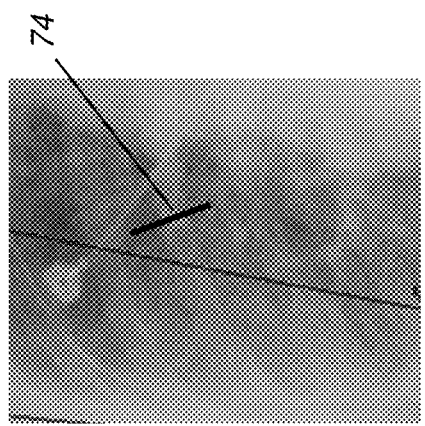
FIG. 5A shows a section of a rib with an identified portion for generating a rib profile in a chest x-ray image.

FIGS. 5A and 5B show how a cross-rib profile is generated in profile generation step 86 and its relationship to the chest x-ray image. In FIG. 5A, a line 74 shows the basic direction over which the profile is obtained, across the rib in a cross-sectional manner. In FIG. 5B, a rib 70 is shown schematically in cross section, representing a bony shell and a soft interior portion. A cross-rib profile 72 shows how rib 70 affects image data, with peak values along the edges. X-rays are generally incident in the direction indicated V in this figure.

Profile 72 is generated using known characteristics of the rib in the chest x-ray. One method for providing rib profile 72 is to apply a low-pass filter (LPF) to the chest image and use the results of this processing to provide a cross-rib profile, which is known to those skilled in image processing and analysis. An alternate method employs a model to provide an initial approximation or starting point for developing the rib profile. Using information from the model also enables rib profile information to be identified and extracted from the image itself. Whatever method is used, the usefulness of the rib profile depends, in large part, upon accurate detection of rib edges.

The two Vogelsang et al. references cited earlier describe how the cross-rib profile can be generated and used. In the article "Model based analysis of chest radiographs", Vogelsang et al. particularly describe how the cross-rib profile is used as a model, and show how six regions for vertical compensation values are identified and interpolation applied using this model.

Figure 6:
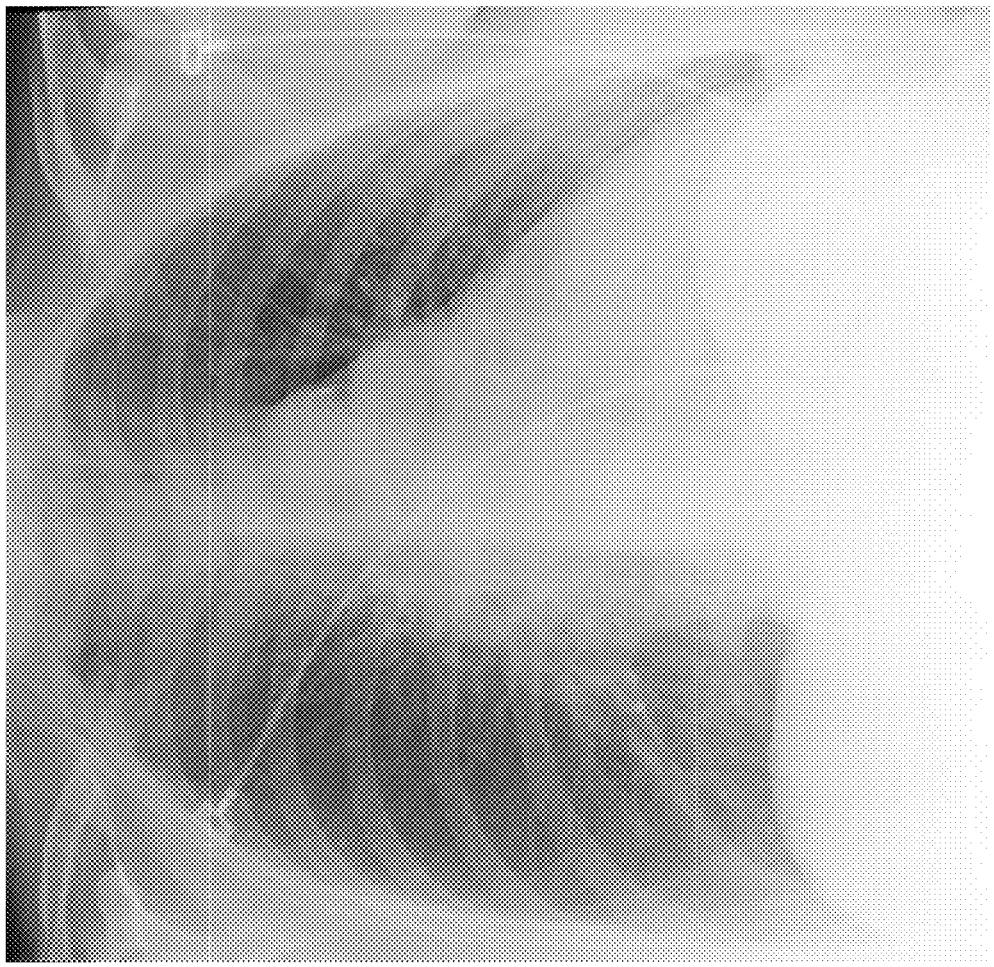
FIG. 6 shows an original chest x-ray image prior to processing for rib suppression.
Figure 7A:
FIG. 7A shows results from rib detection.
Figure 7B:
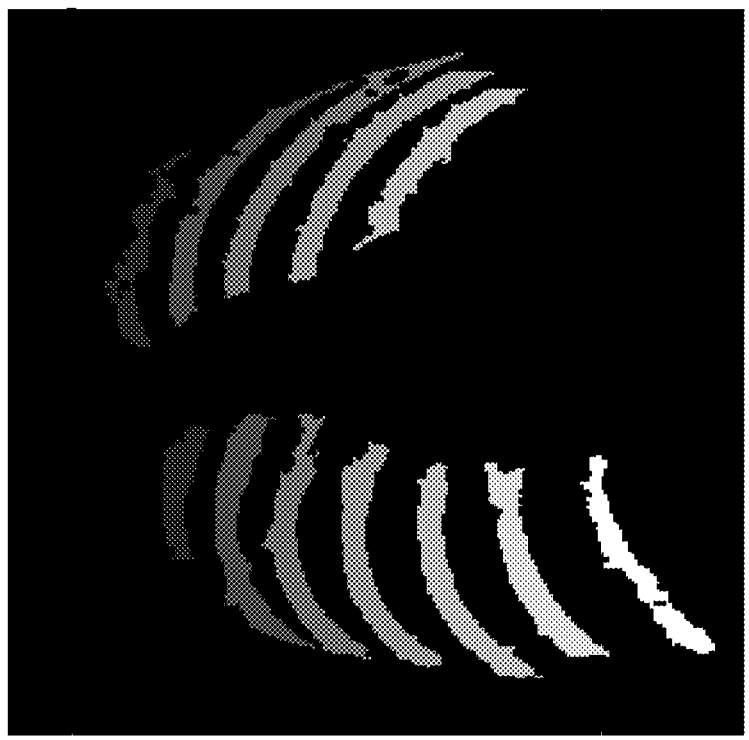
FIG. 7B shows results from rib labeling.
Figure 8:
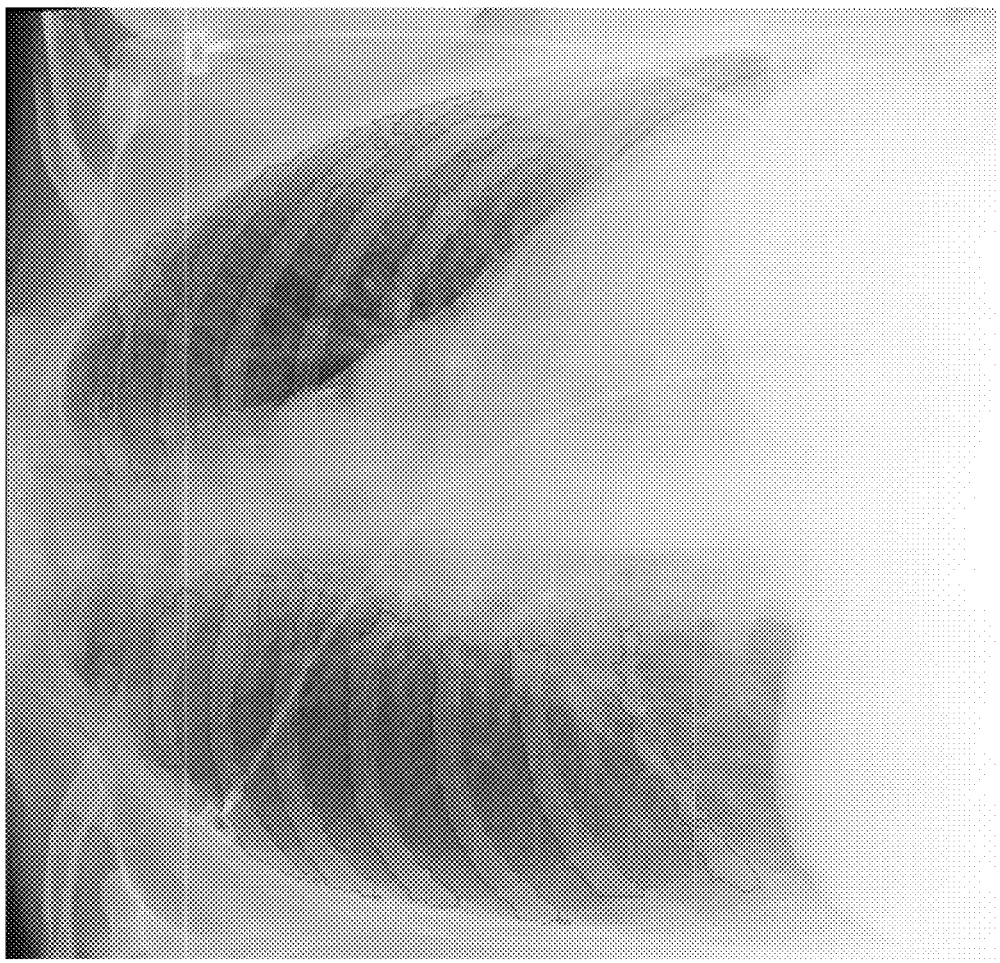
FIG. 8 shows labeled ribs overlaid onto the original image of FIG. 6.

By way of example, FIG. 6 and following show results of some of the steps of the processing sequence for rib removal from 2-D projection images according to an embodiment of the present invention. FIG. 6 shows an original chest x-ray image 38 that requires identification and removal of ribs in order to make underlying tissue more visible. FIG. 7A shows an image 44 that shows rib detection. FIG. 7B shows an image 46 following rib labeling that helps to more precisely identify the rib regions. In FIG. 8, an image 62 shows labeled ribs overlaid onto the original image 38.

Figure 9A:
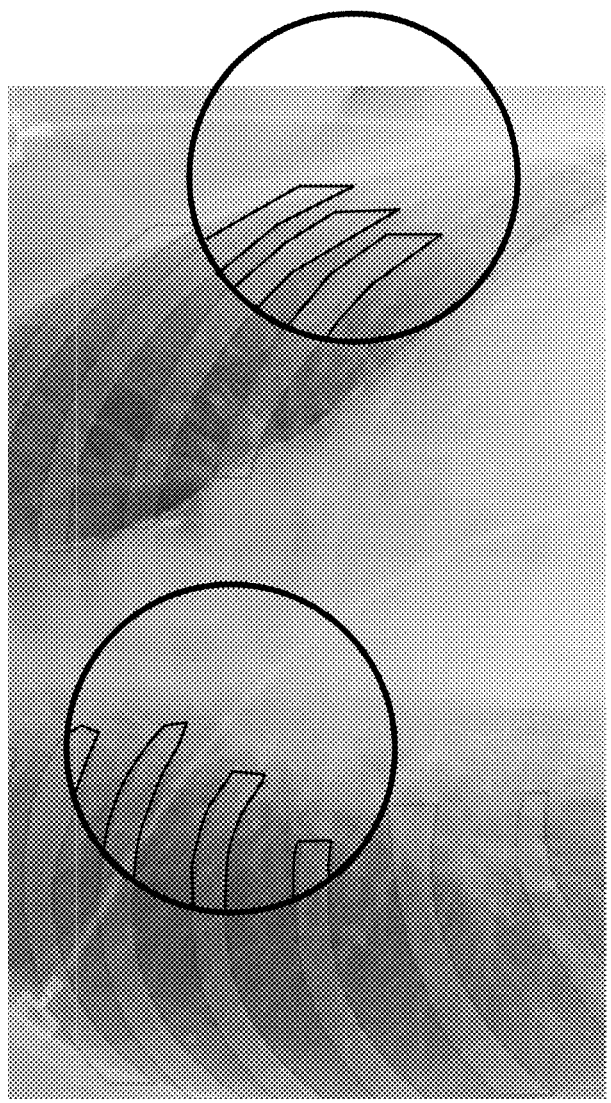
FIGS. 9A and 9B show examples of rib growing algorithms.
Figure 9B:
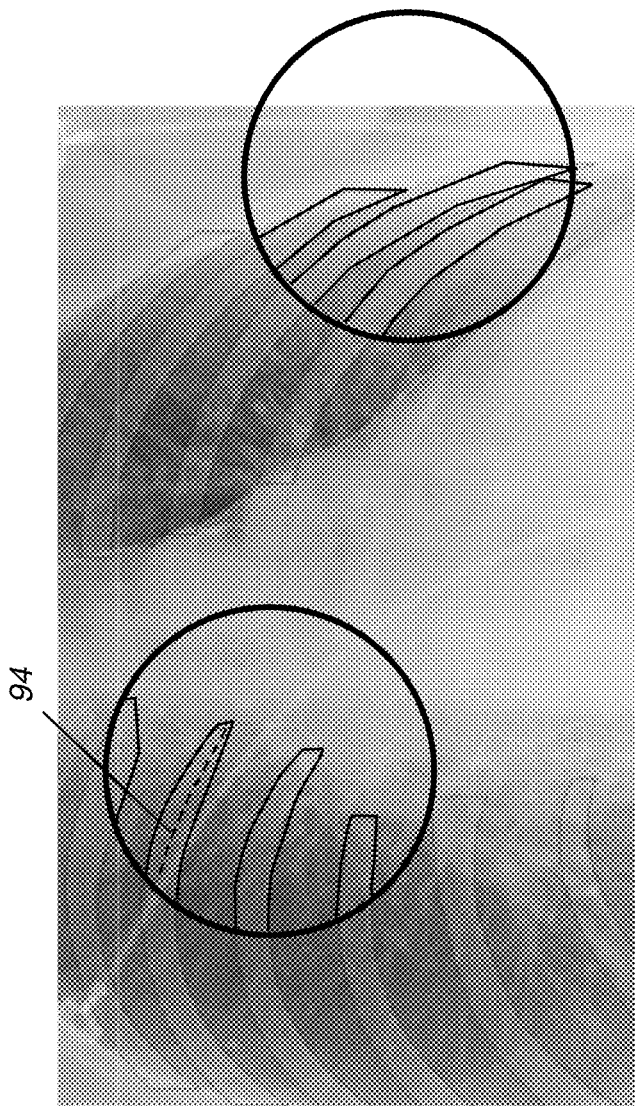

FIGS. 9A and 9B show an example of rib growing using the overlaid results of FIG. 8. Rib growing algorithms are of particular value for extending the rib curvature along the ends of the rib, where features may be unclear, and help to provide improved edge detection. In an embodiment of the present invention, rib growing algorithms follow the general curvature of a medial axis 94.

Figure 10A:
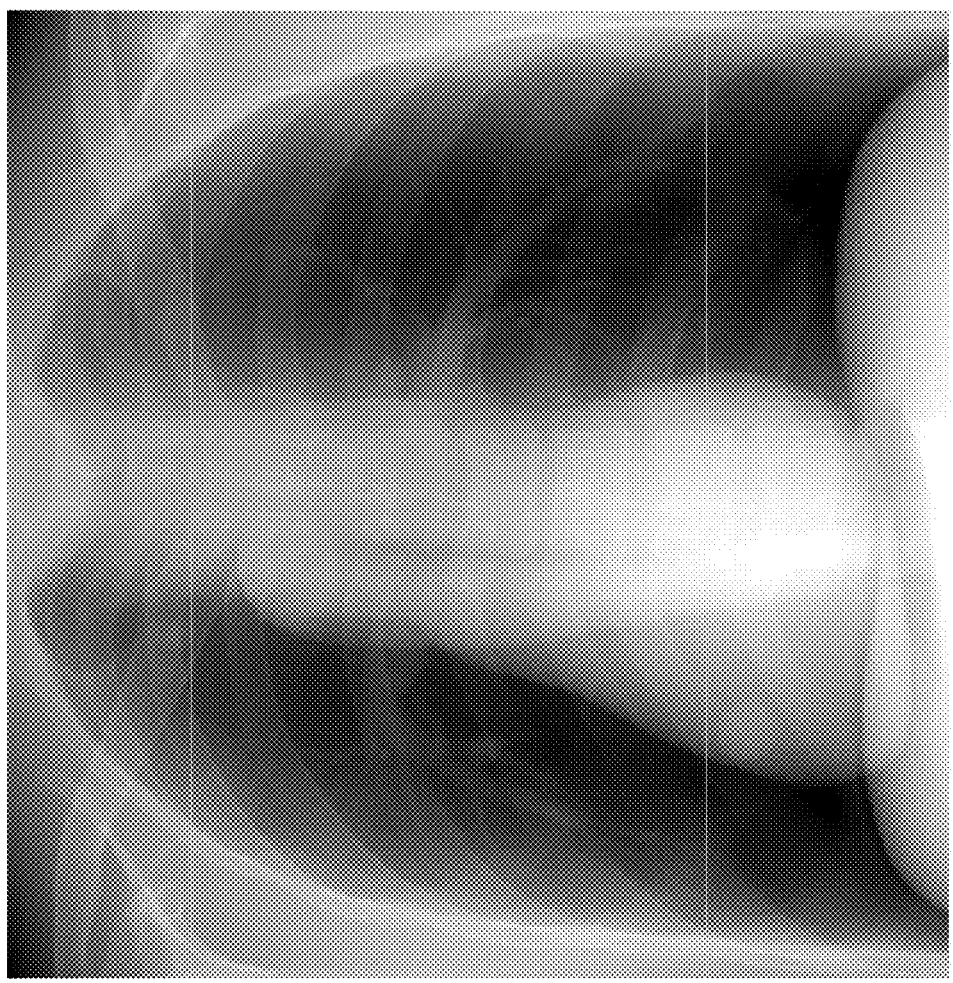
FIG. 10A shows a chest x-ray image with unsuppressed rib content.
Figure 10B:
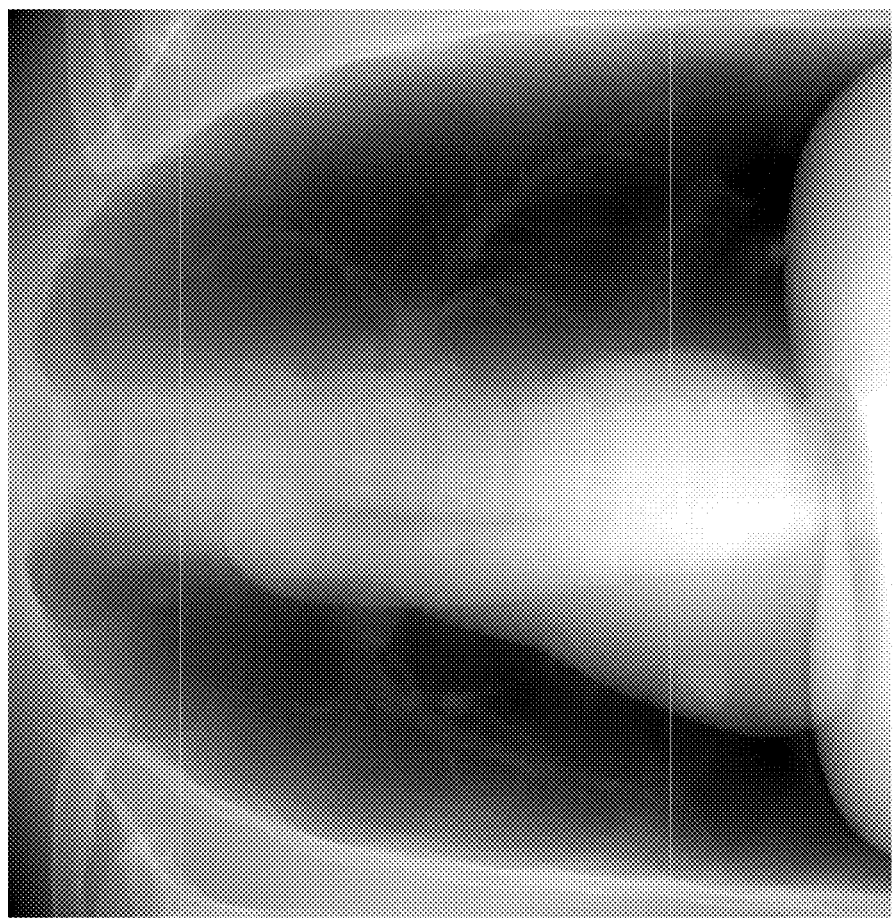
FIG. 10B shows a chest x-ray image with suppressed rib content, following a subtraction operation.

FIGS. 10A and 10B show a chest x-ray image with unsuppressed and suppressed rib content, respectively. Subtraction or other ways of combining rib edge information with the final image provide a rib suppressed image, as shown in FIG. 10B.

Embodiments of the present invention help to provide more accurate detection of rib edges than available using conventional methods, such as shape modeling. In an alternate embodiment of the present invention, only the rib edge profiles are subtracted from the original image to provide rib suppression.

Figure 11:
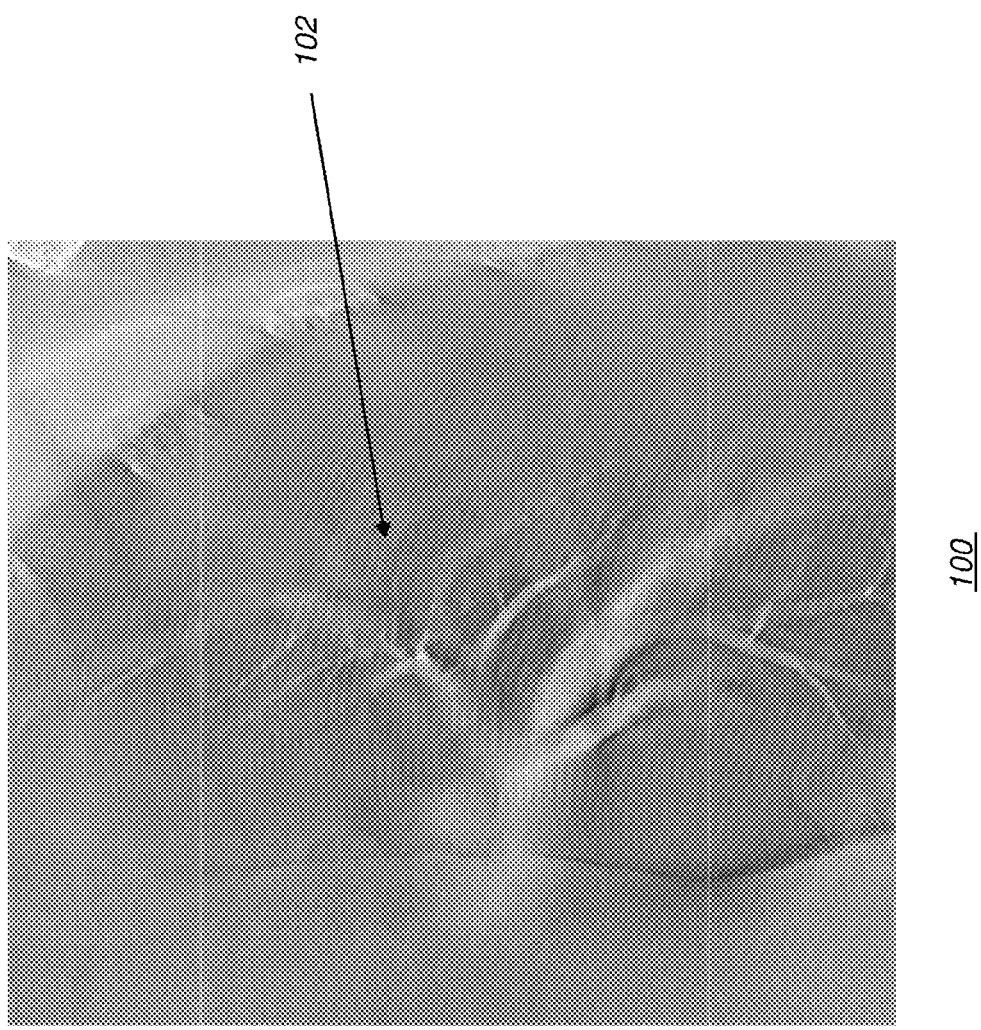
FIG. 11 shows a volume image of a patient's chest having a ripple artifact.
Figure 12:
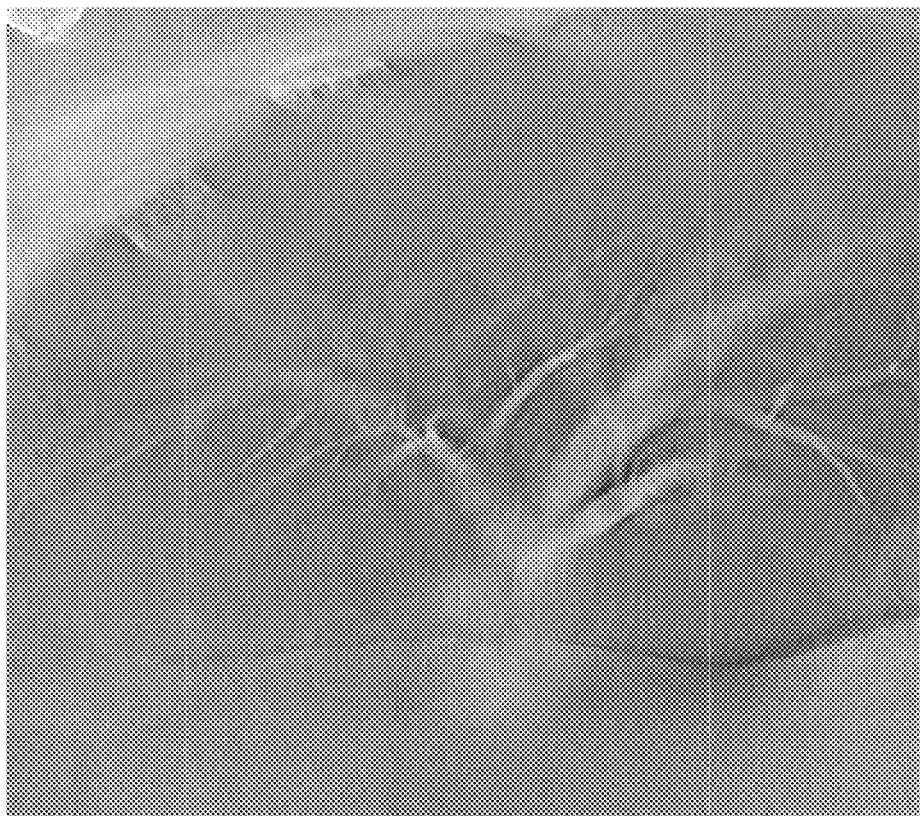
FIG. 12 shows a volume image of a patient's chest without a ripple artifact.

As noted in the background material given previously, one acknowledged problem common to tomographic images of the chest cavity using conventional methods relates to ripple artifacts. FIG. 11 shows an image 100 generated using tomography and having a ripple artifact 102. FIG. 12 shows a chest cavity tomography image 110 generated according to an embodiment of the present invention, without a perceptible ripple artifact.

Figure 13:
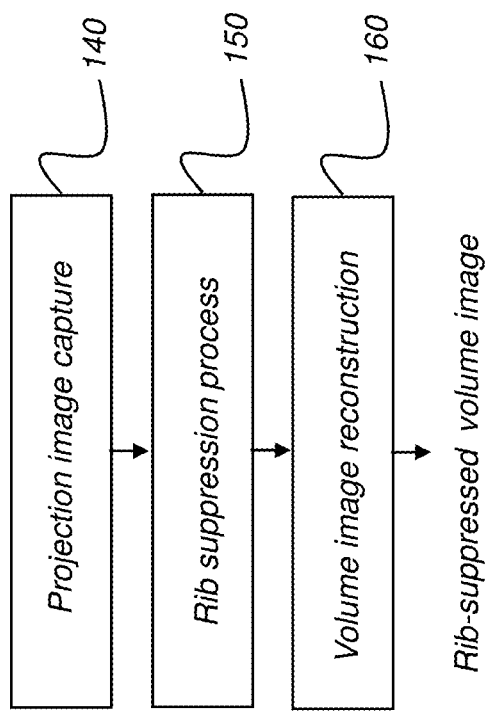
FIG. 13 is a logic flow diagram showing steps for generating volume image data.

The logic flow diagram of FIG. 13 shows steps in a sequence for generating a tomography volume image with suppressed rib content, according to an embodiment of the present invention. A projection image capture step 140 captures the 2-D projection images of a patient's chest cavity, as described previously with respect to FIG. 1. A rib suppression process step 150 then conditions each of the captured 2-D projection images in order to generate rib-suppressed projection images, using the process described previously with reference to FIG. 2. A volume image reconstruction step 160 then performs the needed reconstruction for generating the rib-suppressed volume image.

Volume image reconstruction is well known in the tomography arts and can be executed according to a number of algorithms that take 2-D projection images obtained at different angles as input and provide the reconstructed volume image data as output. These methods include filtered back projection and other similar techniques for combining the 2-D projection image data.

While the sequence of FIG. 13 can be used to form a rib-suppressed volume image, the results can be disappointing due to problems related to image consistency, missed or unsuccessfully or partially segmented ribs, and artifacts such as ripple artifacts, as noted previously. Embodiments of the present invention address these problems by taking advantage of information that is available in considering the projection images as an ordered set, as defined previously. Predictive information is obtained from previously processed images in order to process successive images in the processing sequence. Results from subsequent processing are then recursively used to improve and, in some cases correct, image processing for images that have been initially processed. Probabilistic and model-based techniques are applied to improve processing results for the projection images, improving the accuracy of the final tomographic reconstruction that is obtained. Embodiments of the present invention thus take advantage of the existence of an ordered set of images, each taken of the same subject but at a slightly different angle. This information is used to help improve feature detection within each image. Suppression and related image processing can then operate with improved accuracy, generating a resulting volume image that has improved visibility of soft tissue and other features that might otherwise be obscured by the rib cage.

In the processing described with reference to FIG. 13, projection image capture step 140 generates an ordered set of unsegmented projection images. These images are ordered according to the capture sequence, as noted previously. Alternately considered, projection images in the ordered set are ordered according to the relative angle of image capture; each of the unsegmented projection images has a corresponding capture angle, which is used for both predictive and iterative processing, as described subsequently.

For the description that follows, the ordered or indexed set A of unsegmented projection images has m elements:

$$A=\{1,2,n \ldots (m-2),(m-1),m\}$$

For the description that follows, the index n is used for processing each of the successive m elements. Similarly, the complete ordered or indexed set B of segmented projection images has n elements:

$$B=\{1,2, \ldots (n-2),(n-1),n\}$$

When all of the images are used, m=n. However, a subset of the m elements can be processed or an indexed set of n images can have the same or fewer than m elements. Before rib segmentation, set B is empty. Ordered or indexed set B is generated in an accumulative fashion as iterative processing to detect rib features progresses, as described in more detail subsequently.

The simplified schematic of FIG. 14 shows, in an overhead view and with exaggerated dimensions and spacing for clarity of description, tomographic imaging apparatus 200 with only five representative detector positions 424, 426, 428, 430, and 432, in order. Where the images are captured in a clockwise direction, unsegmented image set A would have five projection images, sequenced in this same position 424, 426, 428, 430, and 432 and the same order.

Model Generation and Predictive Model Segmentation Method

Figure 15A:
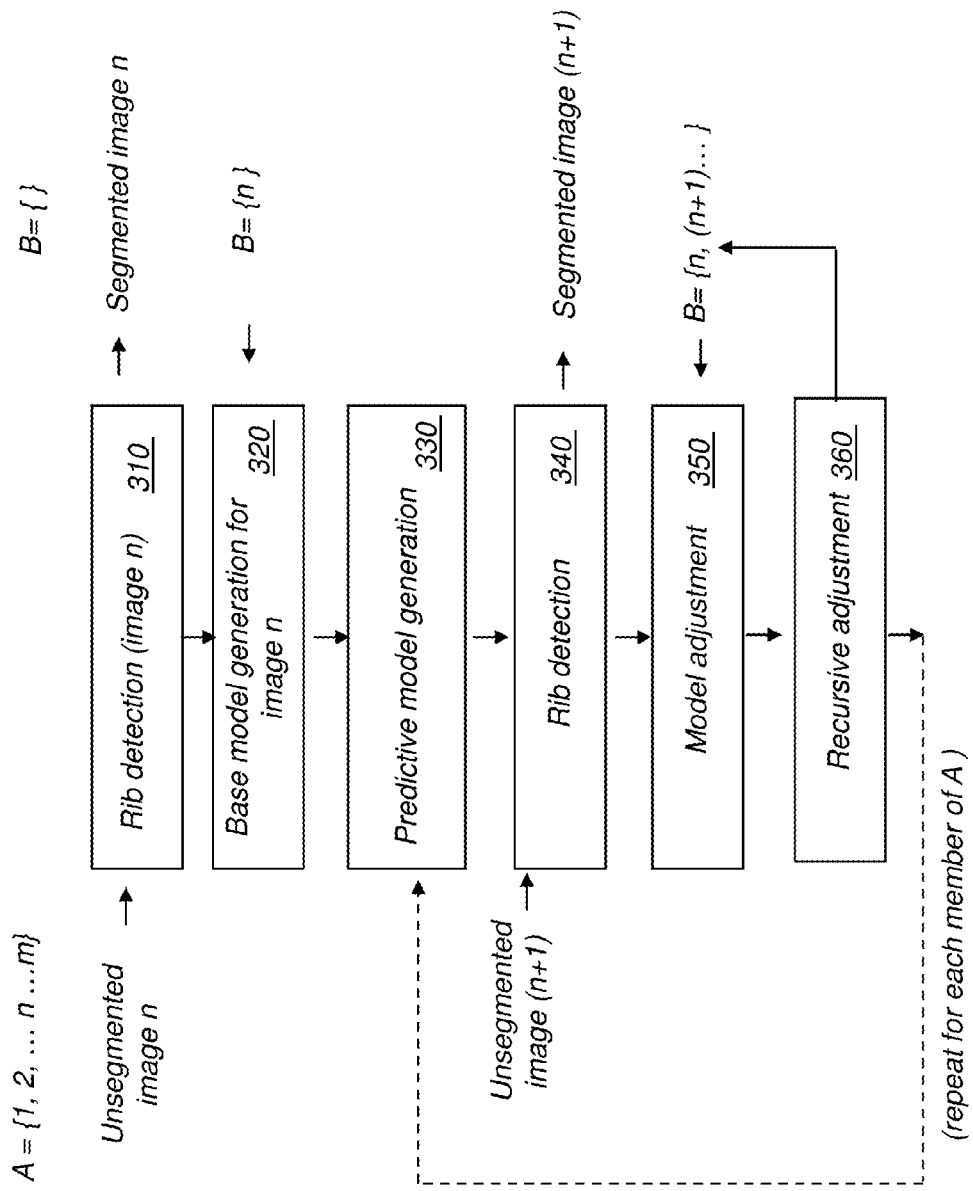
FIG. 15A is a logic flow diagram that shows a sequence for processing projection images for rib detection and suppression.

The logic flow sequence shown in FIG. 15A describes how initial processing of the ordered set A of unsegmented projection images to form ordered set B of segmented projection images is executed, according to an embodiment of the present invention. As noted previously, images can be acquired, processed, and stored in any order, provided that suitable indexing information is available for each image. It should also be noted that image processing is described as successive processing in ascending order from image n to image (n+1); however, image processing can proceed through adjacent images in the opposite or descending order direction, so that image n processing is followed by image (n−1) processing, with the necessary changes to the description. For the sake of clarity and by way of example and not of limitation, the following description proceeds with indexing in ascending order. It should also be noted that image processing may proceed in index increments of 2 or more images.

Set B is initially empty. Processing begins by selecting one member n of indexed set A. A rib detection step 310 is executed, identifying rib edges and other distinctive rib features, using techniques such as those previously described. A segmented image n is generated and becomes part of set B. Rib detection step 310 results are weighted in probabilistic fashion, so that features that are distinct and likely to indicate ribs are given a relatively high weighting value while features that are indistinct or missing are assigned relatively low values. Based on these results, a base model generation step 320 is executed, in which a base model of the rib cage is generated. It is recognized that a number of problems are possible with this base model, due to indistinct results from rib detection; iterative processing is provided for improving the model as processing proceeds, as well as improving the detection for segmented image n.

Continuing with the FIG. 15A sequence, adjacent unsegmented image (n+1) is then processed using the process that is shown. A predictive model generation step 330 executes, modifying information from the generated base model according to the angular increment stored with adjacent image (n+1). A rib detection step 340, using the predictive model, then segments image (n+1) to provide segmented image (n+1) which, in turn, becomes part of set B. A model adjustment step 350 then optionally adjusts the original base model if needed to resolve ambiguity or refine detection results, using results from step 340. A recursive adjustment step 360 then executes to resolve problems with segmented images in set B, here, for image n according to the adjusted model.

From the initial sequence shown in FIG. 15A, it can be seen that iteration of steps 330, 340, 350 and 360 for subsequent adjacent images (n+2), (n+3), and so on execute to generate and improve subsequent results, predicting rib features for each successive unsegmented image and iteratively improving the model and the set of segmented images B. As noted previously, it can also be appreciated that this process can work in either direction, backward or forward, through the elements of set A in order to completely constitute set B. All or a portion of the m elements of the indexed set A can be processed in this way. According to an embodiment of the present invention, both unsegmented projection images in set A and segmented projection images in set B are stored to allow alternate processing methods to be used. Storage can be in a PACS (Picture Archiving and Communications System) or other image storage system.

It should be noted that generating the set of segmented images B is an interim step in volume image generation, as described earlier with reference to FIG. 13. Once the rib features are accurately identified, rib suppression and related processing as well as rib removal can be used more effectively to generate the set of processed projection images that are then used in volume image reconstruction.

According to an alternate embodiment of the present invention, the unsegmented set of images A is separated into two or more subsets, with multiple successive images in each subset. The same basic sequence of steps shown in FIG. 15A is executed on each subset in order to provide the needed detection. This type of subset-based processing may speed the processing of individual projection images and provide acceptable results, particularly since can help to reduce some of the iterative processing that may increase overall processing time and may not be needed.

According to yet another alternate embodiment of the present invention, the image processing sequence of FIG. 15A starts with an image n that has a particular angular position where detection has been shown to be generally more accurate, such as due to improved visibility of rib features. This may mean beginning processing in the middle of the ordered set A, for example. Successive processing of the set of images can then use the subset separation just described, moving through the ordered set A in each direction to provide complete rib detection for the set of projection images.

Figure 15B:
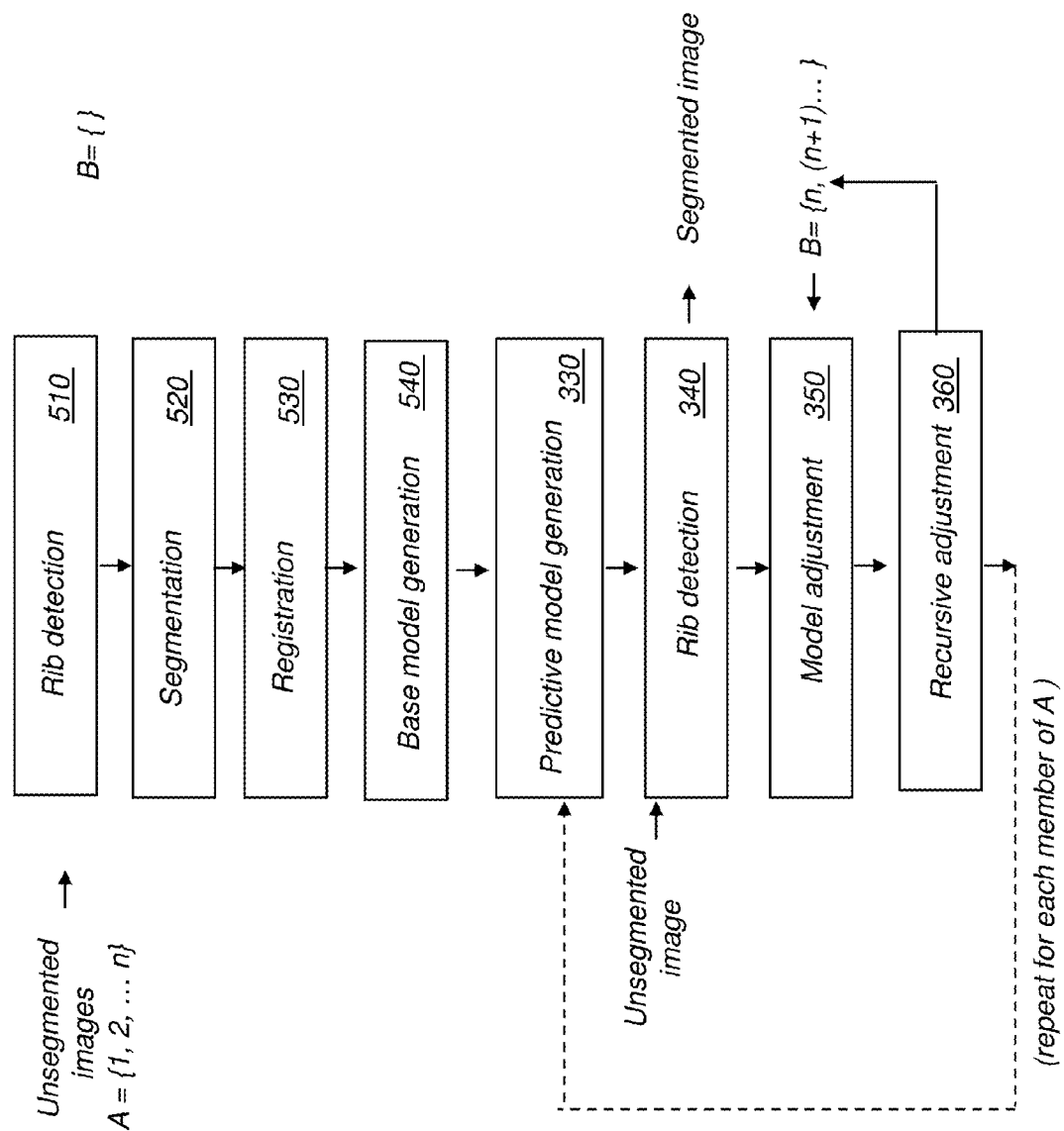

FIG. 15B shows an alternate approach for generating a base model that is used as a basis for detecting rib features. A subset n of some number of unsegmented images is processed to detect ribs in a rib detection step 510, followed by a segmentation step 520 for the images. The processed subset may include any two or more unsegmented images and may include all of the unsegmented images. A registration step 530 is then executed, in which the subset of processed images are registered to each other, aligning identified rib features for improved generation of the base model. A base model generation step 540 then applies this registered data to generate an improved base model for subsequent processing of one or more additional unsegmented images. Processing then follows as in FIG. 15A, with steps 330, 340, 350, and 360, as described previously. Step 360 is then an optional step, since the base model that is initially generated in step 540 is improved over that generated in the process shown in FIG. 15A. According to an alternate embodiment of the present invention, images are segmented, then registered to each other to generate the base model.

Various techniques for generation, modification, and use of an imaging model are known to those skilled in the image processing arts. Such methods are particularly useful with features such as rib cage structures, since these features can be more readily statistically characterized from a larger sample population. Various methods, known to those skilled in the image processing arts, can be applied in order to improve consistency, image to image, for improving the appearance of the resulting reconstructed image.

Those skilled in the image processing arts are familiar with various methods for generating a correspondence between image n and its adjacent images (n−1) and (n+1) using 2-D registration, in rigid or non-rigid manner, such as by using incremental shifting of image data content from one image to the next. Alternately, such a correspondence can be computed using 3-D information obtained from the geometry of the image acquisition system, including the angle of the image source and detector relative to the imaged subject.

"Moving Window" Segmentation Method

Figure 16:
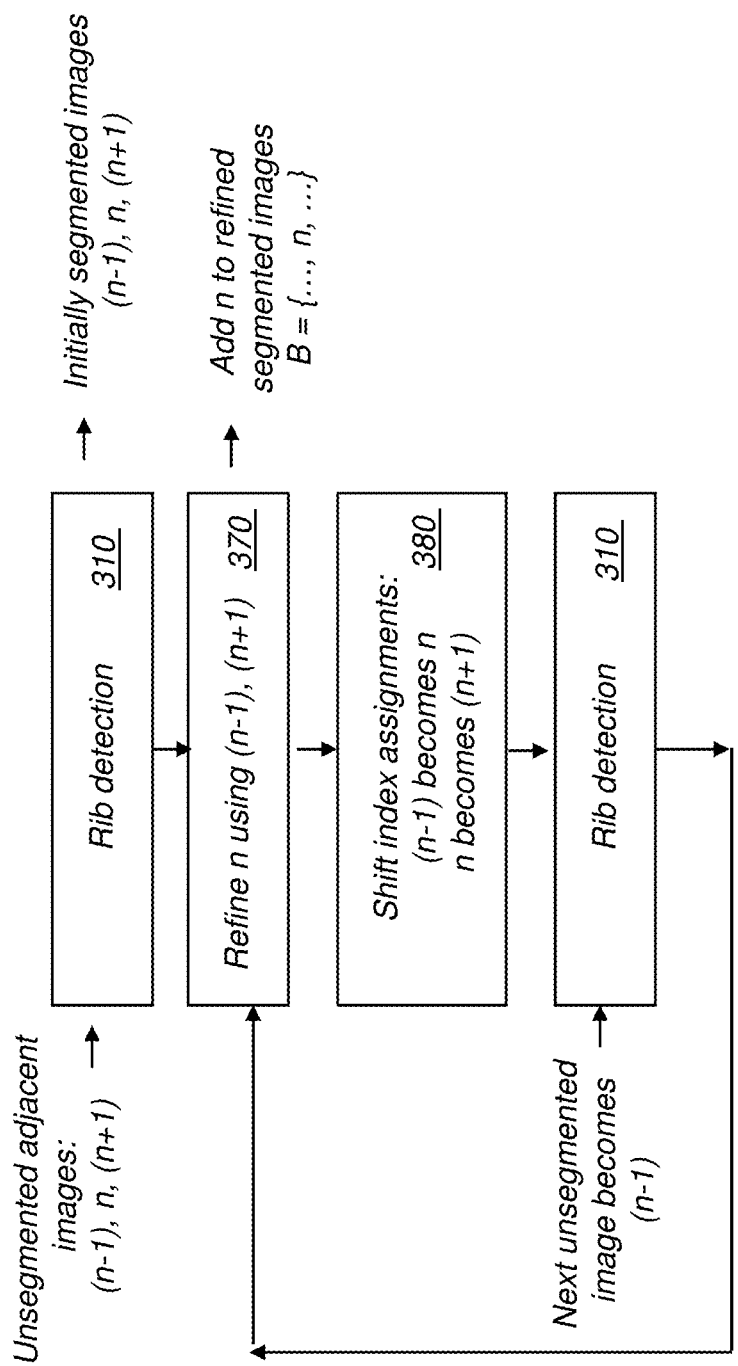
FIG. 16 is a logic flow diagram that shows a sequence for processing projection images using results from adjacent images.

The logic flow diagram of FIG. 16 shows an alternative sequence for generating an ordered set of segmented images B that can be subsequently processed to suppress rib content and then used for volume image reconstruction according to an alternate embodiment of the present invention. This sequence uses a type of moving pointer or "window" that identifies and processes each image according to a small set of its adjacent images. This window is successively indexed through the ordered set of unsegmented projection images A in an incremental fashion. A rib detection step 310 is executed on an unsegmented image n and its adjacent preceding and subsequent projection images (n−1) and (n+1), respectively. In a refinement step 370, the detection applied to image n is refined according to results from the adjacent preceding and subsequent projection images (n−1) and (n+1). This refinement can correct for errors, missing features, and ambiguities and other problems in the original rib detection that was provided. The refined, segmented image is then added to segmented projection image set B. For the next iteration of this process, in a shift step 380, the window is effectively moved to the next initially segmented image, reassigning image (n−1) to have index n and reassigning image n to have index (n+1). Rib detection step 310 is executed on the next unprocessed image as image (n−1). Then, processing loops back through steps 370 and 380 as shown. With continued iteration, segmented projection image set B is populated with projection images that can be further processed using rib suppression techniques and then combined to provide volume image data.

For the sequence described with reference to FIG. 16, it can be appreciated that the effective size of the window, that is, the number of adjacent projection images that are used in processing each image can vary. For example, this pattern can be expanded to use two preceding images (n−2), (n−1) and two subsequent images (n+1), (n+2) to process each image n. It can also be appreciated that the first and last members of the ordered set of unsegmented projection images A have only a single adjacent member, so that the sequence of FIG. 16 would be modified accordingly.

Consistent with at least one embodiment, the system utilizes a computer program with stored instructions that perform on image data that is accessed from an electronic memory. As can be appreciated by those skilled in the image processing arts, a computer program of an embodiment of the present invention can be utilized by a suitable, general-purpose computer system, such as a personal computer or workstation. However, many other types of computer systems can be used to execute the computer program of the present invention, including an arrangement of networked processors, for example. The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the system may also be stored on computer readable storage medium that is connected to the image processor by way of the internet or other network or communication medium. Those skilled in the art will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It is noted that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for rib suppression in a volume chest x-ray image, the method executed at least in part by a computer system, comprising:
   forming a first set of unsegmented projection images by capturing a plurality of projection images, each projection image having a corresponding capture angle;
   forming a second set of segmented projection images from the first set of unsegmented projection images by:
   (a) detecting rib features in a first unsegmented projection image to form a first segmented projection image in the second set and generating a base model according to the detected rib features for the first unsegmented projection image;
   (b) processing each of one or more additional unsegmented projection images from the first set to add members to the second set by a repeated sequence of:
      (1) generating a predictive model from the base model;
      (2) detecting rib features in the unsegmented projection image using the generated predictive model to store a segmented image in the second set of images;
      (3) adjusting the base model according to the detected rib features; and
      (4) correcting rib detection in one or more members of the second set of images;
   conditioning one or more of the unsegmented projection images of the first set of images to suppress rib content based on information from segmentation of the second set of images;
   reconstructing the volume chest x-ray image according to two or more of the conditioned projection images; and
   displaying, storing, or transmitting the reconstructed volume chest x-ray image.

2. The method of claim 1 wherein detecting rib features for unsegmented projection images comprises forming a conditioned projection image by:
   identifying a region of interest in the projection image;
   detecting and labeling one or more ribs in the region of interest;
   detecting rib edges of the one or more detected ribs; and
   generating cross rib profiles along the detected ribs.

3. The method of claim 1 further comprising generating a correspondence between one or more adjacent images using incremental shifting.

4. The method of claim 1 wherein detecting rib features comprises identifying the lung region.

5. The method of claim 1 wherein detecting rib features comprises extracting a medial axis from at least one of the one or more imaged ribs.

6. The method of claim 1 wherein detecting rib features comprises adjusting segments of one or more of detected rib edges to improve edge fitting.

7. The method of claim 1 further comprising scaling one or more unsegmented projection images to a reduced resolution.

8. The method of claim 1 wherein detecting rib features comprises applying a growing or extending algorithm for rib edges.

9. The method of claim 1 wherein the second set of images has fewer members than the first set of images.

10. A method for rib suppression in a volume chest x-ray image, the method executed at least in part by a computer system and comprising:
    forming a first set of unsegmented projection images by capturing a plurality of projection images, each at a corresponding capture angle;
    forming a second set of segmented projection images from the first set of unsegmented projection images by a repeated sequence of:
    (a) designating a first projection image from among members of the first set of images that are not yet segmented;
    (b) detecting rib features in the first projection image and in at least one adjacent projection image that was captured before or following the first projection image;

(c) refining the rib feature detection for the first projection image and the at least one adjacent projection image according to the rib feature detection for the first projection image and the at least one adjacent projection image to generate a first segmented projection image; and (d) assigning the first segmented projection image to the second set of images;

suppressing rib feature content from one or more of the unsegmented projection images of the first set of images based on the segmentation information from the second set of images;

reconstructing the volume chest x-ray image according to the plurality of rib-suppressed projection images; and displaying, storing, or transmitting the reconstructed, volume chest x-ray image.

11. The method of claim 10 wherein detecting rib features for unsegmented projection images comprises forming a conditioned projection image by:

identifying a region of interest in the projection image;

detecting and labeling one or more ribs in the region of interest;

detecting rib edges of the one or more detected ribs; and generating cross rib profiles along the detected ribs.

12. The method of claim 10 further comprising conditioning one or more of the projection images in the second set to suppress rib content.

13. The method of claim 10 wherein detecting rib features comprises identifying the lung region.

14. The method of claim 10 wherein detecting rib features comprises extracting a medial axis from at least one of the one or more imaged ribs.

15. The method of claim 10 wherein detecting rib features comprises adjusting segments of one or more of detected rib edges to improve edge fitting.

16. The method of claim 10 further comprising scaling one or more unsegmented projection images to a reduced resolution.

17. The method of claim 10 wherein detecting rib features comprises applying a growing or extending algorithm for rib edges.

18. A method for rib suppression in a volume chest x-ray image, the method executed at least in part by a computer system and comprising:

forming a first set of unsegmented projection images by capturing a plurality of projection images, each at a corresponding capture angle;

forming a second set of segmented projection images from the first set of unsegmented projection images by:

(a) detecting ribs in a subset of the unsegmented projection images;

(b) segmenting rib content within the subset of images;

(c) registering the subset of images to each other;

(d) generating a base model according to the registered subset of images;

(e) processing each of one or more additional unsegmented projection images from the first set to add members to the second set by a repeated sequence of:

(1) generating a predictive model from the base model;

(2) detecting rib features in the unsegmented projection image using the generated predictive model to store a segmented image in the second set;

(3) adjusting the base model according to the detected rib features; and (4) correcting rib detection in one or more members of the second set;

conditioning one or more of the unsegmented projection images of the first set of images to suppress rib content based on information from segmentation of the second set of images;

reconstructing the volume chest x-ray image according to two or more of the conditioned projection images; and displaying, storing, or transmitting the reconstructed volume chest x-ray image.

19. The method of claim 18 further comprising storing at least the first set of unsegmented projection images.

* * * * *